July 11, 1961 P. L. BETZ 2,992,288

FAST-ACTING THERMOELECTRIC GENERATORS

Filed Dec. 31, 1958 4 Sheets-Sheet 1

INVENTOR
PAUL L. BETZ

BY Cameron, Kerkam & Sutton
ATTORNEYS

INVENTOR
PAUL L. BETZ

BY Cameron, Kerkam & Sutton
ATTORNEYS

July 11, 1961 P. L. BETZ 2,992,288

FAST-ACTING THERMOELECTRIC GENERATORS

Filed Dec. 31, 1958 4 Sheets-Sheet 3

INVENTOR
PAUL L. BETZ

BY Cameron, Kerkam & Sutton

ATTORNEYS

July 11, 1961 P. L. BETZ 2,992,288

FAST-ACTING THERMOELECTRIC GENERATORS

Filed Dec. 31, 1958 4 Sheets-Sheet 4

INVENTOR
PAUL L. BETZ

BY Cameron, Kerkam & Sutton

ATTORNEYS 2,992,288

FAST-ACTING THERMOELECTRIC GENERATORS

Paul L. Betz, Baltimore, Md., assignor to Baltimore Gas and Electric Company, Baltimore, Md., a corporation of Maryland Filed Dec. 31, 1958, Ser. No. 784,167
7 Claims. (Cl. 136—4)

This invention relates to thermoelectric generators suitable for the direct energization of an associated load device, such as an electromagnetically controlled safety valve for gas burners, and is particularly directed to generators of the type embodying a thermocouple which produces electrical energy when the hot junction of the thermoelements is heated, contacts which control the energy output to the load circuit, and means for actuating the contacts when heating of the hot junction is discontinued.

I have previously disclosed in my Patent No. 2,720,623 thermoelectric generators which incorporate a thermostat within the generator for actuating the contacts controlling the load circuit. Other generators have been described in my Patent No. 2,720,615 and in Fritts et al. No. 2,858,350 wherein thermoelements are employed having different thermal expansion characteristics, the contacts being actuated by relative movement of the thermoelements due to the difference in thermal expansion thereof. In a generator of the latter type, the greater the difference between the linear thermal expansion coefficients of the thermoelements, the greater the movement of the contacts.

One of the principal objects of the present invention is to provide a thermoelectric generator of improved construction which is capable of reducing its thermoelectric current output, in response to an interruption in heating of the hot junction thereof, at a substantially faster rate than that which results from normal cooling of the thermoelements and more quickly than the above-mentioned devices of the prior art.

Another object is the provision of a thermoelectric generator of the character described which responds almost instantaneously to the transient conditions that arise upon discontinuance of heating of the thermocouple, and is capable of such performance over wide ranges of heat inputs and operating temperatures.

A further objective is to provide a fast-acting thermoelectric generator wherein the contacts controlling the load circuit are actuated in a novel manner by and in association with certain members of the generator.

These and other objects, including the provision of means which permit ready adjustment of the thermoelectric generator when at either room temperature or an elevated temperature, will appear more fully upon consideration of the detailed description of the invention which follows. In this connection, it is to be expressly understood that the one specific structural form of thermoelectric generator and the several combinations of thermoelement materials described and illustrated by the accompanying drawings are merely exemplary and are not to be construed as defining the limits of the invention, for which latter purpose reference should be had to the appended claims. It will also be understood that, while the thermoelectric generators herein disclosed are especially well adapted for use in conjunction with safety devices for controlling gas burners, the invention has equal utility in other environments where an immediate response is desired to interruption or discontinuance of a source of heat.

In the drawings, wherein like reference characters refer to like parts throughout the several views.

Figures 1, 2:
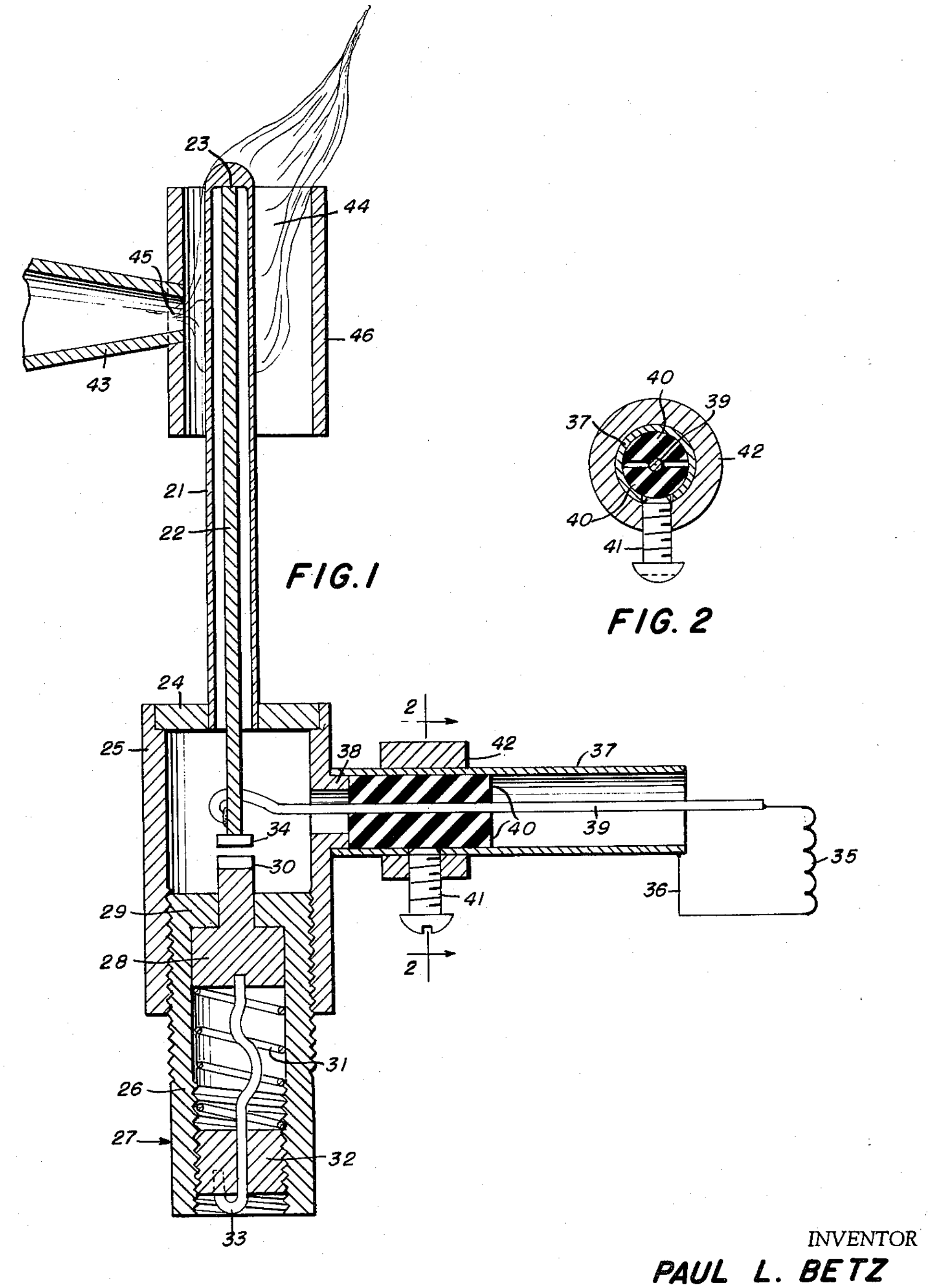
FIG. 1 is a longitudinal sectional view of one structural form of improved thermoelectric generator embodying the invention, cetrain of the parts thereof being shown in full and the associated control device being illustrated diagrammatically.
FIG. 2 is a transverse sectional view taken substantially on line 2—2 in FIG. 1.

The fast-acting thermoelectric generators of the present invention are characterized by their incorporation of thermoelements of suitable electric output having linear thermal expansion coefficients which are preferably approximately equal at elevated temperatures, in combination with a novel arrangement of contact means for controlling the generator output, the thermoelements being so disposed that one of them cools more rapidly than the other when heating of the hot junction is discontinued, and that the transient difference in their rates of contraction which occurs immediately upon interruption of said heating results in actuation of the contacts. Since it is extremely difficult to obtain the optimum combination of thermoelements which have both the desired thermoelectric properties and exactly equal coefficients of linear thermal expansion, the invention also involves a determination of the amount by which the thermal expansion properties of the thermoelements may differ and yet provide the desired prompt contact actuation in response to interruption of heating.

One form of thermoelectric generator embodying these features may compirse a rod-like thermoelement housed within an outer tubular thermoelement and suitably joined to the latter to form a hot junction. With this arrangement, heating of the generator may be by application of a flame close to the hot junction and in contact with the outer thermoelement, which results in the direct application of heat to the outer thermoelement and the indirect heating of the inner thermoelement. Upon interruption or discontinuance of the heating, the initial cooling rates of the outer and inner thermoelements differ due to the fact that heat is lost from the outer element more rapidly than from the inner one. Since the materials of the two thermoelements are so selected that their coefficients of linear thermal expansion are as nearly equal as possible, interruption of heating produces an immediate rapid decrease in length of the outer thermoelement and a slower decrease in length of the inner element. This transient differential contraction of the two thermoelements results in relative movement of the free ends thereof remote from the hot junction and prompt actuation of the associated electrical contact means which control the flow of thermoelectric current to the load circuit.

It is the immediate response of the contacts to interruption of heating which characterizes the thermoelectric devices of the present invention, which response is unaffected by any change in the contact positions that may subsequently occur due to factors which are referred to more fully hereinafter. Other thermocouple constructions will perform similarly to the concentric arrangement mentioned above provided similarity is achieved with regard to the elevated equilibrium temperature attained by the thermoelements and the cooling rates of the thermoelements upon discontinuance of heating.

Thermoelectric generators constructed in accordance with the invention also embody means for limiting the pressure occurring across the contacts because it has been found that, without such means, deformation of the contact surfaces occurs with resultant variations in performance. A further advantage of the contact pressure limiting means is that contact adjustment may be made at room temperature in generators employing certain thermoelement combinations wherein such adjustment would otherwise be impossible.

The thermoelectric devices disclosed herein are capable of responding to flame failure in times as short as one second, depending upon the contact adjustment. For such prompt operation, it is necessary to present a stable flame to the generator, to which end it has been found desirable to position the generator in close proximity to the flame port and to provide a suitable shield to minimize the effects of drafts.

Referring now to FIGS. 1 and 2, the embodiment of the invention illustrated therein comprises a thermocouple consisting of an outer tubular thermoelement 21 and an inner rod-like thermoelement 22 coaxially arranged with respect to one another and joined at their upper or outer ends in any suitable manner, as by welding, to form a hot junction 23. As shown, electrical contact between thermoelements 21 and 22 occurs only at hot junction 23, the inner and outer diameters of said elements being so dimensioned as to provide an annular space therebetween. If desired, electrical insulation may be provided in the space between the two thermoelements, but this has not been found necessary in practice.

Thermoelements 21 and 22 are made of dissimilar materials having different thermoelectric properties and coefficients of linear thermal expansion which differ by less than a predetermined amount hereinafter specified. In one form of the invention, outer thermoelement 21 may be made of Monel metal while inner thermoelement 22 may be made of constantan. Since, as will appear from Table II below, the linear thermal expansion coefficients of Monel and constantan differ by only $.13\times10^{-6}$ and $.07\times10^{-6}$ inches per inch per degree Fahrenheit at 700° and 1000° F., respectively, it is evident that these two thermoelement materials may be regarded as having approximately equal coefficients of linear thermal expansion throughout the range of operating temperatures to which thermocouples are normally subjected.

Outer tubular element 21 is fixed at its lower or free end, remote from hot junction 23, in any suitable manner, as by brazing, to the end wall 24 of a cylindrical body member 25 which may serve as a support for the generator assembly. The lower end of body member 25 is internally threaded to receive the upper externally threaded end of the tubular member 26 of a contact assembly 27 which includes a movable contact supporting member 28 having a reduced diameter portion extending upwardly through an aperture in the end wall 29 of tubular member 26 and carrying at its upper end an electrical contact 30. Contact supporting member 28 is yieldably biased toward end wall 29 by a spring 31 housed in the bore of tubular member 26 and supported at its lower end on a plug member 32 which is adjustably threaded into the lower end of tubular member 26. A flexible conductor 33 electrically connects contact supporting member 28 and plug member 32 so as to provide a low resistance path for thermoelectric current from contact 30 to tubular member 26 of contact assembly 27 and thence through body member 25 and its end wall 24 to outer thermoelement 21.

A second electrical contact 34 is fixed to the lower or free end of inner thermoelement 22 remote from hot junction 23, and is positioned closely adjacent contact 30 for cooperation therewith in controlling energization of the output or load circuit of the thermoelectric generator represented diagrammatically in FIG. 1 by the winding 35. One end of winding 35 is electrically connected to body member 25 through a conductor 36 and tubular lead member 37, the latter being mounted on and electrically connected to a laterally extending boss 38 on body member 25 in any suitable manner, as by brazing. The other end of winding 35 is electrically connected to inner thermoelement 22 by means of a flexible conductor 39 which is soldered or otherwise connected to the lower end of inner thermoelement 22 at a point close to contact 34.

Conductor 39 passes through and is insulated electrically from boss 38 and tubular lead member 37, and is so supported with respect thereto that bending of said conductor externally of body member 25 will not cause displacement of inner thermoelement 22 and its contact 34. To this end, the portion of conductor 39 lying within tubular lead member 37 just outwardly of boss 38 is rigidly supported in any suitable manner as by a pair of semicylindrical members 40 of electrical insulating material which closely fit the inside diameter of lead member 37. Members 40 are adapted to be brought into frictional clamping engagement with conductor 39 by means of a set screw 41 which is fitted into a collar 42 surrounding tubular lead member 37, the inner end of screw 41 passing through an opening in lead member 37 and abutting one of members 40.

In the illustrated embodiment of the invention, heating of the thermocouple comprising thermoelements 21 and 22 is accomplished by a fuel gas burner 43 so positioned as to direct a flame 44 against the upper end of outer thermoelement 21, as indicated in FIG. 1. The preferred position of the flame port 45 of burner 43 is such that the flame 44 will make direct contact with outer thermoelement 21 adjacent the hot junction 23 even at low rates of gas flow. Burner 43 is also preferably provided with a draft shield 46 which may be supported in any suitable manner, as by the burner itself, and which is eccentrically disposed with respect to the thermocouple so that the portion of the shield closest to outer thermoelement 21 is that immediately adjacent flame port 45.

When the burner 43 is operating normally to produce the flame 44 and thereby heat the hot junction 23, the contacts 30 and 34 are separated by a predetermined distance of an order hereinafter specified, as shown in FIG. 1. When thermal equilibrium has been attained under such conditions, the thermoelectric current generated as a result of heating of hot junction 23 flows through a circuit consisting of hot junction 23, inner thermoelement 22, conductor 39, load winding 35, conductor 36, tubular lead member 37, boss 38, body member 25, end wall 24, outer thermoelement 21, and back to hot junction 23.

When heating of the hot junction is interrupted or discontinued by reason of extinction of flame 44, the exposed outer thermoelement 21 cools more rapidly than the enclosed inner thermoelement 22 and, due to the relatively small difference in linear thermal expansion coefficients of said elements, undergoes a more rapid decrease in length than the inner thermoelement, thereby promptly moving contact 34 into engagement with contact 30. Immediately upon closure of the contacts, the load circuit comprising winding 35 is shunted by a low resistance circuit which includes contacts 34 and 30, contact supporting member 28, flexible conductor 33, plug member 32, tubular member 26 of contact assembly 27 and body member 25. Since a major portion of the current output of thermocouple 21, 22 is then diverted through the low resistance shunt path, the current supplied to the load circuit is thereby reduced to a small fraction of its normal value almost instantaneously upon extinction of burner flame 44. The resultant quick, sharp reduction in the current flowing in the output circuit may be utilized in known manner to control a safety device, such as a valve in the fuel line to which burner 43 is connected.

Closure of contacts 34, 30 in response to flame extinction may be temporary depending on the relative values of the linear thermal expansion coefficients of outer thermoelement 21 and inner thermoelement 22, the initial contact spacing, and the initial temperatures and cooling rates of the thermoelements. As will be indicated hereinafter, only limited departure from equality of the linear thermal expansion coefficients is permissible if the objects of this invention are to be achieved. After initial closure of contacts 34, 30 and upon continued cooling of the thermoelements, the contacts may separate and may so remain while at ambient temperature as well as when a flame is reestablished at fuel burner 43, depending again on the cooling characteristics of the thermoelements and the employment of an inner thermoelement having a slightly larger coefficient of linear expansion than that of the outer thermoelement. The load device represented by winding 35 should be of the type that is triggered to operate in response to initial closure of contacts 34, 30, but is unaffected by a subsequent opening of these contacts.

The spacing between normally fixed contact 30 and contact 34 may be adjusted either when the thermoelectric generator is operating normally at an elevated temperature, or when the elements are at room temperature, by simply rotating contact assembly 27 relative to body member 25 in one direction or the other until the contacts reach a "just closed" position, and then rotating the assembly through a measured arc in the direction to move contact 30 to the desired position relative to contact 34. The contact spacing is, of course, a function of the number of threads per inch on body member 25 and contact assembly 27 and the arc through which the latter is rotated. When the desired contact adjustment has been made, a lock nut (not shown) may be employed to maintain contact assembly 27 in its adjusted position relative to body member 25, or the relative positions of these members may be fixed by brazing or soldering them together.

The resilient support of contact 30 provided by movable member 28 and spring 31 not only enables adjustment of the contacts to a so-called negative spacing as hereinafter described, but also permits a limited yielding movement of contact 30 under closing force exerted by contact 34 which prevents deformation of the contact surfaces due to excessive pressure therebetween.

Figure 3:
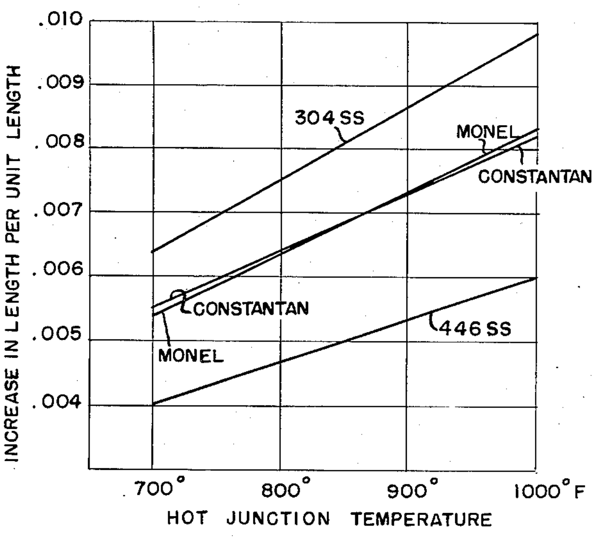
FIGS. 3–10 are graphical representations of the properties and performance of the various thermoelectric generators hereinafter described.

As mentioned above, practical considerations make it difficult, if not impossible, to employ for thermoelements 21 and 22 materials which have exactly equal coefficients of linear thermal expansion at the operating temperatures to which devices of the character described are normally subjected, as well as suitable thermoelectric properties. Experiments have therefore been conducted for the purpose of identifying materials which are capable of producing useful quantities of thermoelectric current when used as thermocouples and for which the difference in expansion characteristics is small but not zero. The following Table I sets forth the nominal compositions of various alloys which have been tested as thermoelements in thermoelectric devices of the structure illustrated in FIG. 1, while Table II gives the linear thermal expansion coefficients of these alloys at temperatures corresponding to the upper (1000° F.) and lower (700° F.) values normally encountered at the thermocouple hot junction, and at an intermediate temperature (850° F.), over the range of heat inputs employed with such devices. FIG. 3 is a graphical representation of the data set forth in Table II with respect to the change in length per unit length of the various thermoelements at various temperatures.

TABLE I

*Nominal compositions of alloys used as thermoelements*

| Thermoelement alloy | Percent C | Percent Mn | Percent P | Percent S | Percent Si | Percent Cr | Percent Ni | Percent Fe | Percent Cu |
|---|---|---|---|---|---|---|---|---|---|
| Stainless steel type 304 | .08m | 2.0m | .045m | .030m | 1.0m | 18.0–20.0 | 8.0–12.0 | r | ---------- |
| Stainless steel type 446 | .02m | 1.5m | .040m | .030m | 1.0m | 23.0–27.0 | 0.25m | r | ---------- |
| Monel [1] | .015 | 1.78 | ---------- | .030 | .09 | ---------- | 66.58 | 1.79 | 29.5 |
| Constantan | ---------- | ---------- | ---------- | ---------- | ---------- | ---------- | 43 | ---------- | 57 |

m=maximum.
r=remainder.
[1] hot rolled.

TABLE II

*Thermal expansion properties of thermoelements*

| Thermoelement alloy | Change in length per unit length | | | Coefficient of linear expansion (inches per inch per ° F.)×10[6] | | |
|---|---|---|---|---|---|---|
| | 700° F. | 850° F. | 1,000° F. | 700° F. | 850° F. | 1,000° F. |
| 304 (stainless steel) | .00637 | .00812 | .00986 | 9.10 | 9.55 | 9.86 |
| 446 (stainless steel) | .00405 | .00501 | .00600 | 5.78 | 5.89 | 6.00 |
| Monel | .00541 | .00692 | .00837 | 7.72 | 8.05 | 8.37 |
| Constantan | .00550 | .00687 | .00830 | 7.85 | 8.08 | 8.30 |

Figure 4:
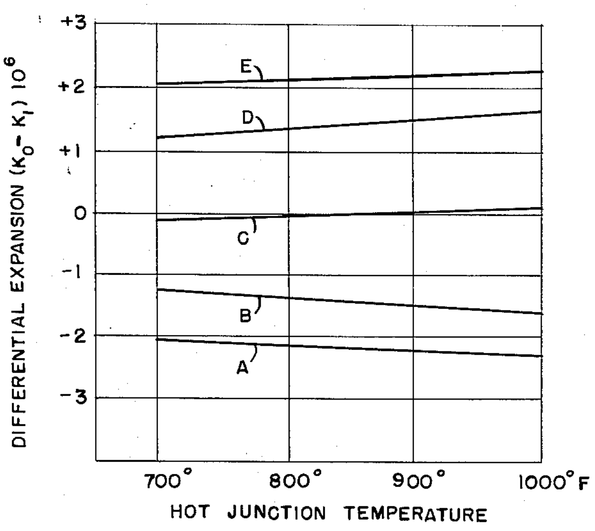

When thermoelements are paired to form thermocouples, the difference between the linear thermal expansion coefficients at a given temperature is an index of the overall movement of the end of one thermoelement remote from the hot junction when the corresponding end of the other thermoelement is held in a fixed position. Table III below gives the differential thermal expansion coefficients for various combinations of the thermoelement alloys of Tables I and II, while FIG. 4 shows in graph form the differential expansion data of the combinations listed in Table III. Since any given pair of thermoelement alloys may be combined in two ways, i.e., with each alloy used as either the directly heated or the indirectly heated thermoelement, the equilibrium position of the movable contact 34 (FIG. 1) will differ in the two cases. In Table III, the differential thermal expansion figures represent the excess of $K_O$, the expansion coefficient of the outer thermoelement, over $K_I$, that of the inner thermoelement, and are therefore negative in those cases where the inner thermoelement has the larger coefficient of expansion.

TABLE III

*Thermal expansion properties of thermocouples*

| Thermocouple | Thermoelement location in thermocouple | | Linear thermal expansion coefficient | | | | | | Differential thermal expansion $(K_O-K_I)\ 10^6$ | | |
|---|---|---|---|---|---|---|---|---|---|---|---|
| | Outer | Inner | 700° F. | | 850° F. | | 1,000° F. | | | | |
| | | | $K_O \times 10^6$ | $K_I \times 10^6$ | $K_O \times 10^6$ | $K_I \times 10^6$ | $K_O \times 10^6$ | $K_I \times 10^6$ | 700° F. | 850° F. | 1,000° F. |
| A | 446 | Constantan | 5.78 | 7.85 | 5.89 | 8.08 | 6.0 | 8.30 | −2.07 | −2.19 | +2.30 |
| B | Constantan | 304 stainless steel | 7.85 | 9.10 | 8.08 | 9.55 | 8.30 | 9.86 | −1.25 | −1.47 | −1.56 |
| C | Monel | Constantan | 7.72 | 7.85 | 8.05 | 8.08 | 8.37 | 8.30 | −0.13 | −0.03 | +0.07 |
| D | 304 stainless steel | do | 9.10 | 7.85 | 9.55 | 8.08 | 9.86 | 8.30 | +1.25 | +1.47 | +1.56 |
| E | Constantan | 446 stainless steel | 7.85 | 5.78 | 8.08 | 5.89 | 8.30 | 6.0 | +2.07 | +2.19 | +2.30 |

In order to establish the performance characteristics of thermoelectric generators embodying the combinations of thermoelements shown in Table III, tests have been made by connecting the generators to a thermoelectrically energized safety valve device known commercially as a BASO safety pilot, and observing the time elapsing between the instant the flame was extinguished and that at which the safety valve closed, an interval commonly designated as the "drop-out" time. In these experiments, it was found that the lower limit of the rate of gas input to the burner for stable operation of the generators was about 0.4 cubic feet per hour, while the maximum input rate used was about 1.7 cubic feet per hour. Natural gas having a nominal heating value of 1030 B.t.u. per cubic foot was used in the experiments. Flame extinction was accomplished by momentarily interrupting the gas flow to the burner and then permitting unignited gas to flow until the safety device operated.

Inasmuch as the quantity of heat stored in the thermoelements is a factor in the performance of the generators, closely the same physical dimensions were employed in all generators used in the tests. Referring to FIG. 1, the outer thermoelement 21 was 2" long, approximately 3/16" in outside diameter and had a wall thickness slightly less than 1/32", while the inner thermoelement 22 was about 2.5" long with a diameter of about 7/64". The same contact assembly 27 was used with each of the generators tested. Where a choice between materials is possible, the preference would be for materials having low specific heats and high absolute values of linear thermal expansion coefficients.

contact adjustment being made for thermal equilibrium at a heating rate of 850 B.t.u. (0.83 cubic feet of gas) per hour.

At any given operating temperature, the contacts can be so adjusted that there will be insufficient contact movement to close the contacts and shunt the load circuit upon discontinuance of heating. Drop-out time would then be increased to the non-contacting value. From the data derived from the tests represented by FIGS. 5, 6 and 7, and from additional experiments wherein the contact spacing was increased to as high as $20.85\times10^{-4}$ inch (i.e., 15°), with heat input rates varying from 500 to 1750 B.t.u. (0.48 to 1.7 cubic feet of gas) per hour, it has been determined that a contact spacing of $2.78\times10^{-4}$ inch (2°), made with the generator in thermal equilibrium at a heat input rate of 850 B.t.u. (0.83 cubic feet of gas) per hour, will give reliable drop-out performance and will be relatively unaffected by minor, unavoidable variations inherent in making the contact adjustment.

Figure 5:
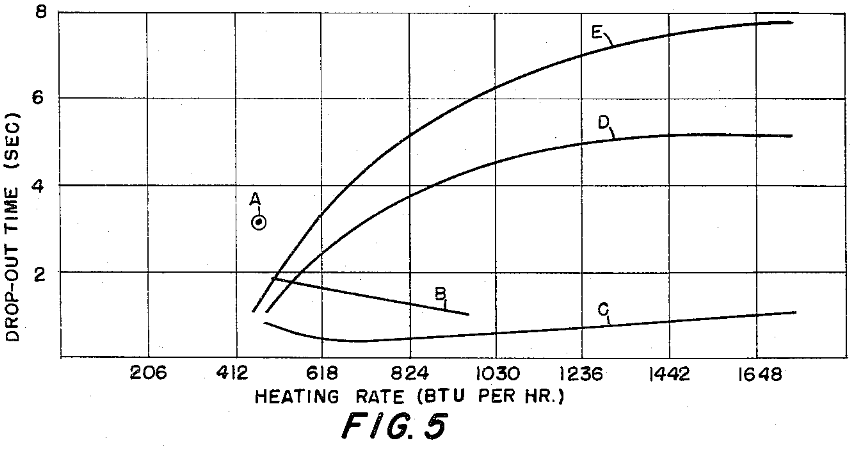
Figure 6:
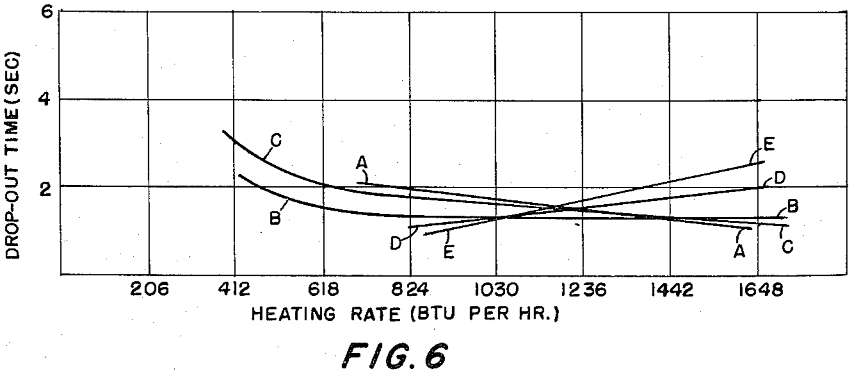
Figure 7:
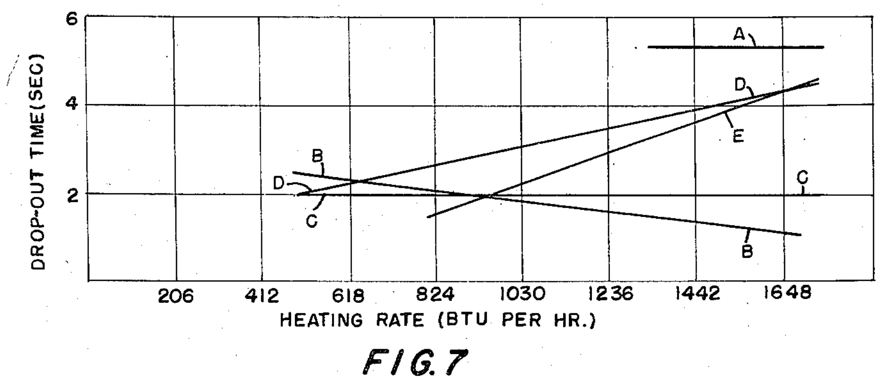

It will be seen from FIGS. 5, 6 and 7 that some of the thermocouples tested gave contacting drop-out over only limited ranges of gas input rates to the burner, and that certain thermocouples, while functioning over the full range of gas input rates, operated in the upper range of drop-out times. These observations are summarized in the following Table IV wherein column (4) lists the thermocouples which gave contacting drop-out over the full range of gas input rates employed in the tests, while columns (2) and (3) indicate the conditions obtaining at contact adjustment.

TABLE IV

*Contact adjustment at elevated temperature*

| (1) | (2) | (3) | (4) | (5) | (6) |
|---|---|---|---|---|---|
| | Contact adjustment conditions | | Thermocouples showing contacting drop-out over full range of gas input rates used in tests | Drop-Out time range (seconds) | Differential thermal expansion at 1,000° F. (from Table III) |
| Fig. No. | Spacing (inch) | Couple in equilibrium at indicated gas rate (cu. ft. per hr.) | | | |
| 5 | $0.69\times10^{-4}$ (0.5°) | 0.48 (500 B.t.u. per hr.) | C | 0.4 to 1 | $+0.07\times10^{-6}$ |
| | | | D | 1 to 5 | $+1.56\times10^{-6}$ |
| | | | E | 1 to 7.5 | $+2.30\times10^{-6}$ |
| 6 | $0.69\times10^{-4}$ (0.5°) | 0.83 (850 B.t.u. per hr.) | B | 2.4 to 1.2 | $-1.56\times10^{-6}$ |
| | | | C | 3 to 1 | $+0.07\times10^{-6}$ |
| 7 | $2.78\times10^{-4}$ (2°) | 0.83 (850 B.t.u. per hr.) | B | 2.5 to 1 | $-1.56\times10^{-6}$ |
| | | | C | 2 (flat) | $+0.07\times10^{-6}$ |
| | | | D | 2 to 4.5 | $+1.56\times10^{-6}$ |

Referring now to FIGS. 5, 6 and 7, the curves of these graphs afford a comparison of the performance of thermocouples A, B, C, D and E of Table III. In these figures the drop-out time in seconds is plotted as the vertical coordinate and the heating rate in British thermal units per hour is plotted as the horizonal coordinate.

In the tests represented by FIG. 5, the contacts of each generator were adjusted to a spacing of $0.69\times10^{-4}$ inch (corresponding to a rotation of the contact assembly through an angle of 0.5° away from the "just closed" contact position), the adjustment being made with the generators in thermal equilibrium at a heat input rate of about 500 B.t.u. (0.48 cubic feet of gas) per hour. The drop-out times in seconds were then recorded as the heat input rate was varied from about 500 to 1750 B.t.u. (0.48 to 1.7 cubic feet of gas) per hour. The curves of FIG. 5 were obtained from the plotted results. In the tests represented by FIG. 6, the contacts were again adjusted to an initial spacing of $0.69\times10^{-4}$ inch, but with the generators in thermal equilibrium at a heat input rate of 850 B.t.u. (0.83 cubic feet of gas) per hour. FIG. 7 shows the performance of the same generators when the initial contact spacing was increased to $2.78\times10^{-4}$ inch (equivalent to a 2° rotation of the contact assembly away from the "just closed" position), the It will be noted that the only thermocouple listed in column (4) of Table IV for each set of contact adjustment conditions is thermcouple C wherein, as indicated in Table III, the differential thermal expansion of its thermoelements is practically zero, i.e., $-0.13\times10^{-6}$ at 700° F., $-0.03\times10^{-6}$ at 850° F., and $+0.07\times10^{-6}$ at 1000° F. Although thermocouple C thus gave the best general performance, others performed well for particular conditions of contact adjustment, assuming that their longer drop-out times are permissible. Thus, if 5 seconds is taken as the maximum desired drop-out time, column (5) of Table IV indicates that, for the conditions of FIG. 5, thermocouples C and D meet the requirements, as do thermocouples B and C for the conditions of FIG. 6, and thermocouples B, C and D for the conditions of FIG. 7. If 7.5 seconds were acceptable as the maximum desired drop-out time, thermocouples B, C, D and E could be used at selected contact spacings and elevated temperatures at the time of contact adjustment.

It is evident from the results of these tests that the most desirable thermoelement combination is one in which the linear thermal expansion coefficients are approximately equal. Where approximate equivalency cannot be obtained as a practical matter, departures there-from are permissible provided the difference between the linear thermal expansion coefficients of the two thermoelements is less than the values indicated in Table III for thermocouples A and E, e.g., less than $2.3\times10^{-6}$ inches per inch per degree Fahrenheit at the arbitrary reference temperature of 1000° F. Any thermoelement combination having a differential linear thermal expansion coefficient within the above limit will provide drop-out times of 5 seconds or less with proper contact adjustment.

All of the tests above described were made with thermoelectric generators wherein adjustment of the contacts was made by allowing thermal equilibrium to be attained at a given rate of heat input to the generator and then setting the contact spacing to the desired value. The generators of the present invention are so constructed, however, that contact adjustment may also be made at room temperature. To make this type of adjustment, it is first necessary to ascertain the position of the contact assembly 27 (FIG. 1) at which the contacts are just closed at room temperature. This may be determined by slightly warming the hot junction of the generator for a few seconds and then varying the position of normally fixed contact 30 until the voltage output to the load circuit, as indicated on a millivoltmeter, drops from a fraction of a millivolt to zero, which is indicative of contact closure. From this position, any desired contact spacing may be established by rotating contact assembly 27 through the appropriate angle, as previously described.

Figure 8:
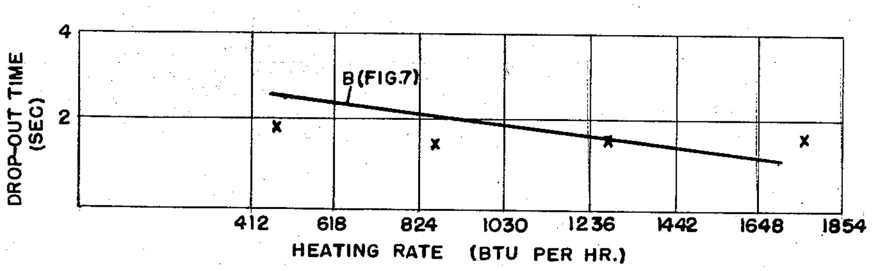
Figure 9:
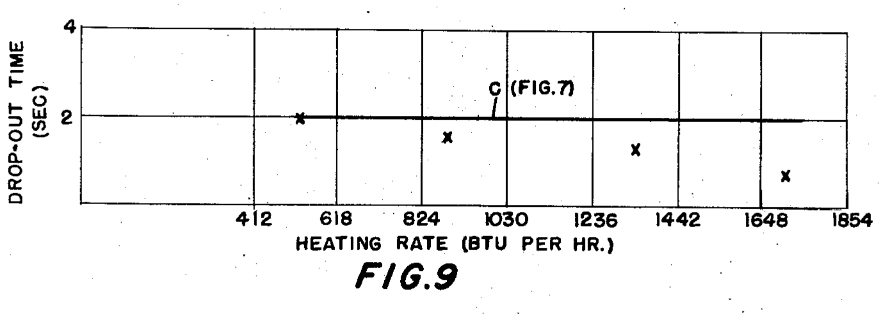
Figure 10:
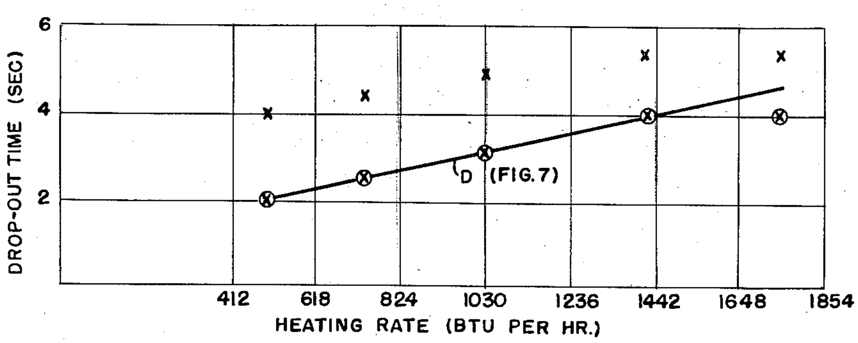

FIGS. 8, 9 and 10 illustrate the drop-out performance of generators B, C and D, respectively, when the contacts were adjusted at room temperature, and also include, for comparison purposes, the performance curves of the same generators when adjusted at elevated temperatures, taken from FIG. 7.

The performance of generator B, with contacts adjusted at room temperature to an initial spacing of $12.5\times10^{-4}$ inch (equivalent to a 9° rotation of the contact assembly away from the just closed position), is shown by the cross marks (x) in FIG. 8. Similar data for generator C, for a contact spacing at room temperature of $8.34\times10^{-4}$ inch (6°), is similarly shown in FIG. 9. In neither of these two tests was it attempted to so adjust the contacts at room temperature as to duplicate the performance obtained after adjustment at an elevated temperature, represented by the solid line dervied from FIG. 7.

In FIG. 10, the cross mark (x) data indicates the performance of generator D when the contact adjustment at room temperature was 0°, i.e., the contacts were just closed, and shows that the drop-out times were greater than when the contacts were adjusted at an elevated temperature, as indicated by the solid line taken from FIG. 7. An effort was then made to duplicate the latter performance more closely by further adjustment of the contacts at room temperature, and it was found that, with a room temperature setting of minus (−) 2°, i.e., with contact 30 (FIG. 1) $2.78\times10^{-4}$ inch beyond the just closed position, the generator performed as indicated by the cross marks enclosed in circles (x) in FIG. 10. A negative contact spacing was required in this case due to the fact that, as shown in Table III, the linear thermal expansion coefficient of the outer thermoelement was larger than that of the inner thermoelement, and at elevated temperatures the equilibrium position of contact 34 was further removed from contact 30 than it was at room temperature. The ability to adjust the contacts to such negative spacings is an additional advantage of the pressure-limiting form of contact means provided by the present invention because, without such a construction, room temperature adustment of thermoelements having positive differential thermal expansion coefficients could not be made over the full range of useful performance.

Although only one structural embodiment of the invention has been illustrated and described in detail herein, i.e., a generator having thermoelements in a concentric arrangement which inherently produces differential cooling rates for the two thermoelements in combination with a circuit, including contacts, which shunts the output or load circuit upon extinction of the heating flame, it will be recognized that the invention is capable of embodiment in other forms. For example, the thermocouple may comprise thermoelements arranged in end-to-end axial alignment and means applied to one or both thermoelements to provide the desired differential cooling rates therefor, and the controlling contacts may be arranged in series, rather than in parallel, with the ouptut circuit. Various other modifications, which will now suggest themselves to those skilled in the art, may be made in the mechanical construction, arrangement and electrical characteristics of the device without departing from the inventive concept. Reference is therefore to be had to the appended claims for a definition of the limits of the invention.

What is claimed is:

1. A concentric type thermoelectric device for controlling the flow of current through an electric output circuit comprising inner and outer thermoelements each having one end joined to one end of the other to form a hot junction, said thermoelements having linear thermal expansion coefficients which are approximately equal over the range of operating temperatures to which the hot junction is normally subjected, an electrically conductive body member permanently connected to one side of the output circuit, the opposite end of said outer thermoelement being joined to said body member and forming a first cold junction therewith, a conductor joined to the opposite end of said inner thermoelement and forming a second cold junction therewith, said conductor being permanently connected to the other side of the output circuit, and adjustable electrical contact means for controlling the flow of thermoelectric current through the output circuit including a first contact electrically connected to and actuated by the opposite end of said inner thermoelement, said first contact being movable relative to said first cold junction upon change of temperature of at least one of said thermoelements, a second contact electrically connected to said first cold junction and cooperating with said first contact to provide a shunt path across the output circuit when in engagement with said first contact, and means resiliently biasing said second contact forwardly toward said first contact and to a forwardly stopped position when said contacts are separated and current is flowing through the output circuit.

2. A concentric type thermoelectric device as defined in claim 1 wherein said inner and outer thermoelements are made of constantan and Monel alloy, respectively.

3. A concentric type thermoelectric device for controlling the flow of current through an electric output circuit comprising inner and outer thermoelements each having one end joined to one end of the other to form a hot junction, said thermoelements having linear thermal expansion coefficients such that the difference between the coefficients of the outer and inner thermoelements is between $+2.3\times10^{-6}$ and $-2.3\times10^{-6}$ inches per inch per degree Fahrenheit at 1000° F., an electrically conductive body member permanently connected to one side of the ouput circuit, the opposite end of said outer thermoelement being joined to said body member and forming a first cold junction therewith, a conductor joined to the opposite end of said inner thermoelement and forming a second cold junction therewith, said conductor being permanently connected to the other side of the output circuit, and adjustable electrical contact means for controlling the flow of thermoelectric current through the output circuit including a first contact electrically connected to and actuated by the opposite end of said inner thermoelement, said first contact being movable relative to said first cold junction upon change of temperature of at least one of said thermoelements, a second contact electrically connected to said first cold junction and cooperating with said first contact to provide a shunt path across the output circuit when in engagement with said first contact, means resiliently biasing said second contact forwardly toward said first contact, stop means for limiting the forward movement of said second contact, and means for adjusting the position of said stop means relative to said first contact.

4. A concentric type thermoelectric device as defined in claim 3 wherein the range of adjustment of said stop means includes one position wherein said second contact is in its forwardly stopped position and is separated from said first contact, and another position wherein said second contact is in engagement with said first contact and is displaced rearwardly from its forwardly stopped position.

5. A concentric type thermoelectric device as defined in claim 3 wherein the linear thermal expansion coefficient of the outer thermoelement is greater than that of the inner thermoelement.

6. A concentric type thermoelectric device as defined in claim 3 wherein the linear themal expansion coefficient of the inner thermoelement is greater than that of the outer thermoelement.

7. A concentric type thermoelectric device for controlling the flow of current through an electric output circuit comprising inner and outer thermoelements each having one end joined to one end of the other to form a hot junction, the linear thermal expansion coefficient of the outer thermoelement being greater than that of the inner thermoelement but the difference between said coefficients being less than about $2.3 \times 10^{-6}$ inches per inch per degree Fahrenheit at 1000° F., an electrically conductive body member permanently connected to one side of the output circuit, the opposite end of said outer thermoelement being joined to said body member and forming a first cold junction therewith, a conductor joined to the opposite end of said inner thermoelement and forming a second cold junction therewith, said conductor being permanently connected to the other side of the output circuit, and adjustable electrical contact means for controlling the flow of thermoelectric current through the output circuit including a first contact electrically connected to and actuated by the opposite end of said inner thermoelement, said first contact being movable relative to said first cold junction upon change of temperature of at least one of said thermoelements, a second contact electrically connected to said first cold junction and cooperating with said first contact to provide a shunt path across the output circuit when in engagement with said first contact, means resiliently biasing said second contact forwardly toward said first contact, and adjustable stop means for limiting the forward movement of said second contact, said stop means being adjustable to a position wherein said second contact is in engagement with said first contact and is rearwardly displaced from its forwardly stopped position.

References Cited in the file of this patent

UNITED STATES PATENTS

| | | |
|---|---|---|
| 2,720,615 | Betz | Oct. 11, 1955 |
| 2,858,350 | Fritts et al. | Oct. 28, 1958 |

UNITED STATES PATENT OFFICE

CERTIFICATE OF CORRECTION

Patent No. 2,992,288 July 11, 1961

Paul L. Betz

It is hereby certified that error appears in the above numbered patent requiring correction and that the said Letters Patent should read as corrected below.

Column 1, line 72, for "cetrain" read -- certain --; column 2, line 29, for "compirse" read -- comprise --; columns 5 and 6, TABLE III, last column, for "+2.30", first occurrence, read -- -2.30 --; column 9, line 45, for "dervied" read -- derived --; line 69, for "adustment" read -- adjustment --; column 10, line 10, for "ouptut" read -- output --; column 11, line 18, for "themal" read -- thermal --.

Signed and sealed this 21st day of November 1961.

(SEAL)
Attest:

ERNEST W. SWIDER
Attesting Officer

DAVID L. LADD
Commissioner of Patents

USCOMM-DC